Figure 1:
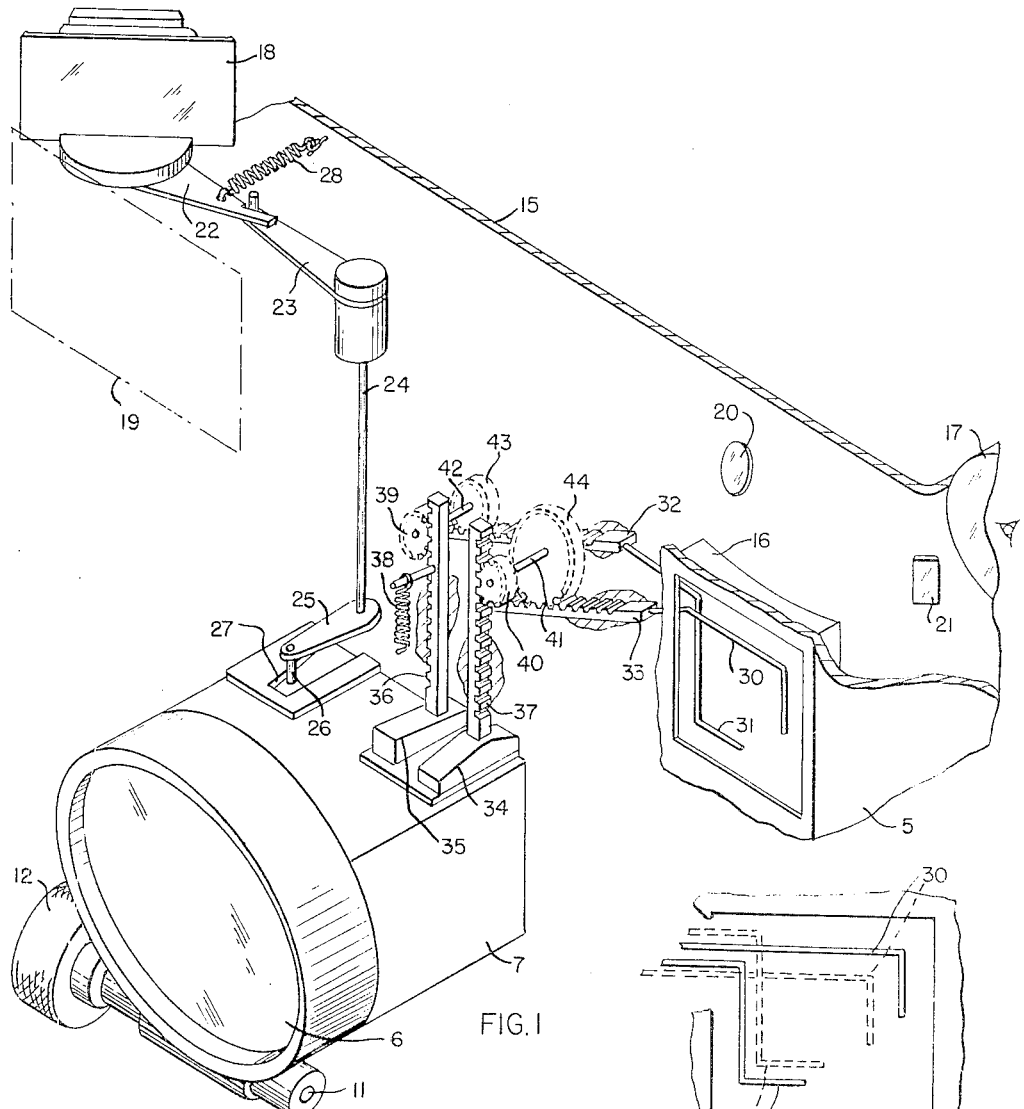

March 13, 1956  I. JEROME ET AL  2,737,844

RANGE FINDER AND VIEW FINDER

Filed July 12, 1951

INVENTORS
EDWARD K. KAPRELIAN
IVAN JEROME
BY
Harry M. Saragovitz
Attorney

United States Patent Office 2,737,844
Patented Mar. 13, 1956

2,737,844

RANGE FINDER AND VIEW FINDER

Ivan Jerome, Southampton, N. Y., and Edward K. Kaprelian, West Long Branch, N. J., assignors to the United States of America as represented by the Secretary of the Army Application July 12, 1951, Serial No. 236,368

1 Claim. (Cl. 88—1.5)

This invention relates to cameras and particularly to cameras having view finder means spaced from the taking lens and adapted to accurately indicate when the camera has been adjusted to photograph with precision the desired subject matter whether it be situated close to the camera or at a greater distance up to a distance approaching infinity.

The invention is applied to a camera having the usual elements such as a taking lens provided with focusing means and means for presenting photo-sensitive sheet material to a predetermined focal plane.

Heretofore there have been many suggestions for approximating ideal view finding means wherein the operator of a camera is automatically informed of the area covered by the taking lens for any position thereof. The present invention provides a view finder which has been developed to positively control an indicating means in such a manner that all of the errors inherent in such a device are automatically corrected.

The invention provides a view finder which is provided with movable framing elements which are under the direct control of a mechanism designed to move them in synchronism with focusing movement of the taking lens to indicate the true area of field of the taking lens corrected for parallax. The actuating mechanism for accomplishing the above includes one or more cams located upon the taking lens and having a contour calculated to indicate the true area and position of the field of the lens to which it is secured. Other lenses of different focal length may be supplied for the camera, each lens having a cam similar to the cams on the other lenses but in each case having its contour adapted to its own focal length and other peculiar characteristics.

In addition to the cam on each lens a mechanism is built into the body of the camera for transmitting the motion developed by the cams to the framing elements situated in the field of the view finder. This mechanism may be designed to have application to different types of cameras and will be described herein as applied to a specific type of camera wherein it is desirable to amplify the movement generated by the cams on the lenses thereby reducing the bulk of the whole mechanism and increasing its operational efficiency.

It is a primary object of the invention to provide a camera having means separate from the taking lens thereof for indicating the true area and position of the image created by the camera's taking lens upon the camera's format at its focal plane.

A further object of the invention is to provide a combined range finder and view finder for a camera which automatically indicates the field of view thereof both as to the actual area covered by the camera's taking lens and as to the axial position of the taking image for all positions of the camera's lens whether it be focused for extreme close-up pictures or upon subjects at relatively great distances from the camera approaching the infinity position.

A still further object of the invention is to provide a universal automatically adjustable view finder system which indicates a fully corrected field for each of a plurality of interchangeable lenses.

Other objects and features of the invention will more fully appear from the following description and will be particularly pointed out in the claim.

Figure 3:
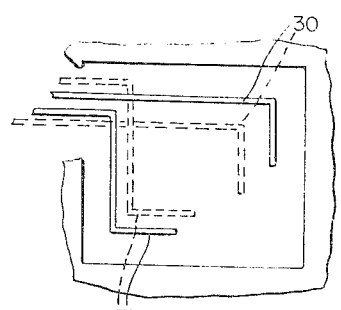
Figure 2:
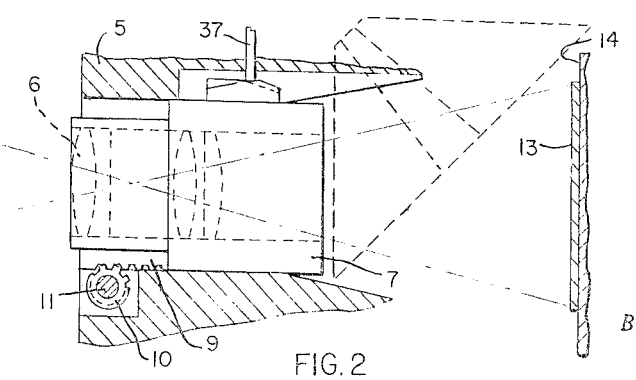

To provide a complete and accurate understanding of the invention a particular embodiment thereof will be described and illustrated in the accompanying drawings in which Fig. 1 is a perspective view illustrating a preferred embodiment of the invention. Fig. 2 is a schematic sectional view of the arrangement of the taking lens and its focusing means with respect to the camera focal plane and shutter. Fig. 3 is a diagrammatic view showing the change in position of the view framing elements of the view finder when a change in the focusing adjustment thereof is made.

The invention may be incorporated in a wide variety of camera types but has particular adaptability for small and medium size hand cameras. Herein only the basic elements of the camera which relate directly to the invention are illustrated. The other necessary elements are or may be conventional.

The type of camera to which the invention is applied herein has a compact body structure 5 within which are slidably received a plurality of interchangeable lenses having different focal lengths designed to cover the desired range of magnification. Desirably, each lens 6 is mounted in a specially constructed barrel 7. Each of the barrels 7 is so constructed that it will be interchangeably received in the camera body regardless of their focal length and when received in the camera may be focused upon the common format of the camera upon which the sensitive material is situated.

Focusing movement of the lenses along the camera axis 8 may be obtained in any desired manner such as by means of a rack and pinion drive. Each lens is provided with a rack 9 secured thereto which meshes with a pinion 10 mounted upon a shaft 11 rotatably mounted in the camera body 5. The shaft 10 is provided with a knob 12 by means of which the image created by the lens is focused upon sensitive sheet material 13 located at a focal plane 14 common to all of the lenses 6. The body 5 is provided with a recess which receives and guides each of the lenses 6.

The camera is provided with a range finder and view finder desirably situated above and having the base dimension of the range finder substantially laterally centered with respect to the axis of the taking lens. The finder components are inclosed within a housing 15 which may be an integral part of the camera body. At one end of the housing 15 are situated the elements comprising the view finder which has an optical system for creating an image to be viewed by the operator. The optical axis of the system is parallel to that of the axis of the taking lens. The view finder optical system may comprise any suitable combination lenses to create an accurate field of view. As shown herein the optical system comprises a negative lens 16 at its forward end and a low power positive lens 17 adjacent to the observer's eye. The system is so designed that an image of the subject being photographed appears at the lens 16. The area of the field thus covered should be at least as great as the field of the lens of shortest focal length to be used with the camera. Area of field as used herein is meant to apply to the area of a plane at right angles to the axis of the taking lens and cutting thru a beam of light coming from the subject, passing thru the lens in the camera and covering the camera format.

Range finding means is provided consisting of a movable mirror 18 disposed at an angle of substantially 45° to the camera axis and pivoted upon an axis spaced from the view finder axis the dimension of its base. A light opening 19 in the range finder housing admits light from the subject being photographed to the mirror from where it is reflected to and thru a small negative lens 20 and thence to a small fixed mirror 21 so disposed that a portion of the beam from the mirror 18 is reflected to the observer's eye.

The lens 20 converts the scale of the image reflected from the mirror 20 to the same scale as that of the view finder optical system. To the observer, therefore, the main view finder image has another image super-imposed thereon by reason of the presence of the mirror 21.

By moving the mirror 18 the image seen in the small mirror 21, of a portion of the subject, can be registered properly upon the main view finder image and when so adjusted, the position of the mirror 18 is a direct indication of the distance of the subject from the camera and therefore may be employed to focus the taking lens upon the subject. By properly positioning the mirrors in the range finder and providing a suitable mechanism for synchronizing the movement of the mirror 18 with that of the axial movement of the taking lens an automatic triangulation takes place by means of which accurate range finding is obtained.

The mechanism for moving the mirror 18 may have any suitable construction and as herein shown may be described as follows. The mirror 18 has an arm 22 extending downwardly therefrom, the outer end of which engages the outer end of another arm 23 secured upon a shaft 24 rotatably supported in the camera body and having a short arm 25 secured upon its lower end. The arm 25 is provided with a cam follower stud 26 projecting therefrom which engages a cam 27 secured to the lens barrel 7. The arm 22 is held against the arm 23 by a spring 28 anchored to a fixed point on the camera. Thus, the spring 28 serves to hold the stud 26 against the operating face 27 of the cam.

As the lens 6 is racked in and out to establish the desired focusing, its cam 27 and the cooperating mechanism are so designed and proportioned that when a given subject is in focus the two images seen in the view finder are in register one upon the other.

An important phase of the invention is found in a device which accurately indicates the area of field covered by the taking lens and the position of the field corrected for parallax.

To indicate true field of view a pair of movable framing members 30 and 31 are provided. These members may have any suitable form designed to indicate the outer limits of the field of view. As shown herein, these members are made of wire bent into the proper shape to embrace diagonally opposite corners of the field area. A mechanism is provided for moving the members 30 and 31 in synchronism with the focusing movement of the taking lens. To establish the required relative movement between the taking lens along its axis and the movement of the members 30 and 31 a special type of mechanism is employed.

Before presenting the details of this mechanism, it may be desirable to discuss the factors involved which influence the position of the wires 30 and 31 to insure indication of actual area of field corrected for parallax.

In the camera under consideration as in most cameras the area and the shape of the negative format remains fixed. Consequently, the angle of view of the lens or the area of the subject which a given lens will record upon the film is usually considered to be the area of a subject at the infinity lens position. If the lens is racked out to focus upon a subject close to the lens, this area becomes less and less because in effect the lens is functioning as a progressively longer focal length lens.

In this type of camera there is also another variable which must be considered and that is the correction for parallax. The axis of the taking lens and that of the view finder are spaced an appreciable amount. This spacing is not a serious matter when the subject is at a relatively great distance from the camera. However, when the camera is focused upon a subject close to the camera this difference in viewpoint due to the distance between the axes of the lens and the view finder creates a much greater difference that cannot be overlooked and must be corrected.

With the above variable factors influencing the accurate operation of the view finder, the present invention overcomes the difficulties involved and makes automatic correction thereof in a novel manner. In solving the problems involved it was established that the framing members 30 and 31 must move across the field of the view finder in a generally oblique direction and specifically in a direction dictated by a line extending between the axes of the taking lens and that of the view finder optical system.

This direction of movement for the members 30 and 31 may be established in various ways. As shown herein the framing members are rigidly secured to a pair of support and guiding arms 32 and 33 disposed at an angle parallel to a line extending between the axes of the lens 6 and the view finder optical system. Slots are provided within which the arms 32 and 33 move in a direction as above determined from the relative position of the taking lens and the view finder.

It should be noted that in a camera designed to utilize the principles of the invention the position of the axis of the view finder with respect to the taking lens axis is important in determining a desirable degree of symmetry and efficiency in the camera body.

In the camera shown herein the format is rectangular departing slightly for a square area and the line between the axes of the view finder and taking lens is equal to a diagonal of the rectangle and is somewhat less than 45° from horizontal. The direction of movement of the members 30 and 31 is therefore held to the diagonal of the rectangle.

However, whether the format is square or rectangular the angle of the line intersecting the axes of view finder and taking lens should be held to that of the angle of a diagonal of the format. Under the broad principles of the invention correction for area of field and parallax can be accomplished by using four framing members controlled by appropriate mechanism following the principles of the mechanism above described, in which case oblique movement of the framing member may be used which is not necessarily dependent upon the proportions of the format.

Means must be provided to transmit motion of the arms 32 and 33. A convenient method for doing this is to provide gear teeth thereon which mesh with a driving gear which in turn is motivated by other gearing to be described.

To accomplish the required travel of the members 30 and 31 in a compact and efficient manner it was found that cams fixed to the respective interchangeable lenses provided an accurate and efficient means for actuating the framing members. Cams of themselves could be made to supply the full range of motion desired. Motion amplifying means may, however, be provided between the cams and the framing members thereby to reduce the degree of travel developed by the cams and thus also reducing their size.

A practical form for such motion transmitting device is shown in the drawings wherein a pair of cams 34 and 35 are mounted lengthwise upon the barrel 7 of each taking lens. The cams have their upper faces contoured to produce the correct position of the members 30 and 31 for any position of the taking lens. The motion derived by each cam is transmitted respectively to cam followers 36 and 37 which are guided in the camera body to have substantially vertical movement. The cam followers are held down upon the cams by suitable springs 38. Each of the followers are provided with gear teeth which mesh with and respectively drive pinion gears 39 and 40. The pinions are rigidly mounted upon a pair of shafts 41 and 42 rotatably mounted in the camera body.

The shafts 41 and 42 also have secured thereon respectively larger gears 43 and 44 which in turn mesh with the teeth upon the arms 32 and 33. By a suitable choice of size for the pinions 39 and 40 and the gears 43 and 44 a properly coordinated motion amplifying ratio can be established. The choice of amplifying ratio and the design of the contour of the cams positively controls the movement of the framing members to accurately indicate the true area of field corrected for parallax for any position of the taking lens.

As the lens is racked outward the area of the field as seen in the view finder must be reduced and the whole field must be shifted inward toward the axis of the taking lens. To accomplish the above result the members 30 and 31 must be moved in a definite manner. Considering first the upper member 30, it must be moved downward and toward the axis of the taking lens to accomplish the necessary correction for the two above-stated correction factors. This motion is derived from the cam 36 and its connected gear train. Also the framing member 31 must be simultaneously moved to correct for parallax and reduce the area of field, in which case the shift toward a smaller area of field as the taking lens is racked out is counteracted to some extent by the downward and inward motion required to correct for parallax. The shift in position of the framing members 30 and 31 is shown diagrammatically for a given lens in Fig. 4 wherein the full line position of the framing members indicates the field of view for the infinity setting lens and the dotted position for the extreme close-up setting thereof.

When a change from one taking lens to another is made the framing members are caused to indicate the general shift in area of field by a general average shift in the height of the cams which are provided upon the newly selected lens.

We claim:

In a camera having a frame including a rectangular format, said frame being adapted to receive a lens and barrel having focusing movement in said frame and a view finder on the frame spaced in a radial direction from the axis of said lens, an automatic view indicating mechanism on the camera frame comprising a pair of L-shaped field framing members in the field of view of said finder movable substantially along the line parallel to said format extending between the axis of said lens and said view finder, means for guiding said framing members substantially in said radial direction, separate cam operated mechanisms connected to each of said framing elements, each mechanism having a cam follower, individual cam surfaces fixed to the barrel of said lens extending lengthwise thereof and engaged respectively by said followers, said cam surfaces having a position and contour relative to said barrel representative of the focal length of the lens whereby when the lens is inserted in the camera said cam surfaces will engage said followers to establish the correct size of the field of view corresponding to the lens in use, each cam surface also presenting operating contours along their length calculated to cause said framing members through their respective operating mechanisms to indicate changes in the field of view necessary to correct for parallax between the lens and the finder throughout the focusing travel of the lens.

References Cited in the file of this patent

UNITED STATES PATENTS

| 2,157,547 | Leitz | May 9, 1939 |
| 2,157,548 | Leitz | May 9, 1939 |
| 2,187,246 | Nerwin | Jan. 16, 1940 |
| 2,211,995 | Walker | Aug. 20, 1940 |

FOREIGN PATENTS

| 571,645 | Great Britain | Sept. 3, 1945 |